United States Patent
Warner et al.

(10) Patent No.: US 7,523,131 B2
(45) Date of Patent: Apr. 21, 2009

(54) TECHNIQUES FOR EFFICIENTLY STORING AND QUERYING IN A RELATIONAL DATABASE, XML DOCUMENTS CONFORMING TO SCHEMAS THAT CONTAIN CYCLIC CONSTRUCTS

(75) Inventors: James W. Warner, Mountain View, CA (US); Abhyudaya Agrawal, San Francisco, CA (US); Hui Zhang, Fremont, CA (US); Muralidhar Krishnaprasad, Fremont, CA (US); Ravi Murthy, Fremont, CA (US); Zhen Hua Liu, San Mateo, CA (US); Nipun Agarwal, Santa Clara, CA (US); Vikas Arora, San Francisco, CA (US); Susan M. Kotsovolos, San Carlos, CA (US); Anand Manikutty, Foster City, CA (US); Rohan Angrish, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 11/056,312

(22) Filed: Feb. 10, 2005

(65) Prior Publication Data
US 2006/0179068 A1 Aug. 10, 2006

(51) Int. Cl.
*G06F 17/00* (2006.01)
(52) U.S. Cl. .................. 707/102; 707/4; 715/234
(58) Field of Classification Search .......... 707/2, 707/104.1, 100, 102, 3, 4, 101; 715/500, 715/234
See application file for complete search history.

(56) References Cited

U.S. PATENT DOCUMENTS 5,295,261 A   3/1994   Simonetti (Continued)

FOREIGN PATENT DOCUMENTS

EP   1 241 589 A2   9/2002

(Continued)

OTHER PUBLICATIONS

R. Bourret et al.: A generic Load/Extract Utility for Data Transfer Between XML Documents and Relational Databases, Jun. 8-9, 2000, IEEE Computing SOC., pp. 134-143.

(Continued)

*Primary Examiner*—Hosain T Alam
*Assistant Examiner*—Amy Ng
(74) *Attorney, Agent, or Firm*—Hickman Palermo Truong & Becker LLP (57) ABSTRACT

To associate XML data objects ("child objects"), stored in rows of relational or object-relational tables, with the appropriate XML data objects ("parent objects") from which the child objects descend, tables that contain child objects ("out-of-line" tables) are constructed with an additional column. In one embodiment, this column stores values that identify the root objects, in the appropriate table, from which the respective child objects descend. Hence, the root object from which any given object descends is traceable by following the respective value back to the corresponding root object. In one embodiment, this column stores values that identify the complete XML hierarchical path, through multiple tables, back to the root object from which the respective child objects descend. Consequently, XML query language queries against XML documents stored in such tables can be rewritten as SQL queries against the data in the tables, even in the presence of cyclic constructs.

30 Claims, 4 Drawing Sheets

TABLE X

| DOC_ID | ... | CHILD |
|---|---|---|
| x1 | ... | a1 |
| x1 | ... | ... |
| . | ... | ... |
| x2 | ... | ... |

TABLE A

| ROOT_PATH_ID | row_id | ... | CHILD |
|---|---|---|---|
| x1 | a1 | ... | b1 |
| x1.a1.b1 | a2 | ... | null |
| . | ... | ... | |

TABLE B

| ROOT_PATH_ID | row_id | ... | CHILD |
|---|---|---|---|
| x1.a1 | b1 | ... | a2, b2 |
| x1.a1.b1 | b2 | ... | null |
| . | ... | ... | |

U.S. PATENT DOCUMENTS

| | | | |
|---|---|---|---|
| 5,404,513 A | 4/1995 | Powers et al. | |
| 5,467,471 A | 11/1995 | Bader | |
| 5,625,815 A | 4/1997 | Maier et al. | |
| 5,630,125 A | 5/1997 | Zellweger | |
| 5,680,614 A | 10/1997 | Bakuya et al. | |
| 5,724,577 A | 3/1998 | Exley et al. | |
| 5,734,887 A | 3/1998 | Kingberg et al. | |
| 5,878,415 A | 3/1999 | Olds | |
| 5,960,194 A | 9/1999 | Choy et al. | |
| 5,974,407 A | 10/1999 | Sacks | |
| 5,983,215 A | 11/1999 | Ross et al. | |
| 5,987,506 A | 11/1999 | Carter et al. | |
| 5,999,941 A | 12/1999 | Andersen | |
| 6,012,067 A | 1/2000 | Sarkar | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,240,407 B1* | 5/2001 | Chang et al. | 707/2 |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,341,289 B1 | 1/2002 | Burroughs et al. | |
| 6,343,287 B1 | 1/2002 | Kumar | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,418,448 B1 | 7/2002 | Sarkar | |
| 6,438,562 B1 | 8/2002 | Gupta et al. | |
| 6,449,620 B1 | 9/2002 | Draper et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,516,327 B1 | 2/2003 | Zondervan et al. | |
| 6,571,231 B2 | 5/2003 | Sedlar | |
| 6,574,655 B1 | 6/2003 | Libert et al. | |
| 6,584,459 B1 | 6/2003 | Chang et al. | |
| 6,604,100 B1 | 8/2003 | Fernandez et al. | |
| 6,636,845 B2 | 10/2003 | Chau et al. | |
| 6,642,946 B1* | 11/2003 | Janes et al. | 715/854 |
| 6,643,633 B2 | 11/2003 | Chau et al. | |
| 6,675,230 B1 | 1/2004 | Lewallen | |
| 6,708,186 B1 | 3/2004 | Claborn et al. | |
| 6,718,322 B1 | 4/2004 | Brye | |
| 6,721,727 B2 | 4/2004 | Chau et al. | |
| 6,725,212 B2 | 4/2004 | Couch et al. | |
| 6,732,222 B1 | 5/2004 | Garritsen et al. | |
| 6,754,661 B1 | 6/2004 | Hallin et al. | |
| 6,772,350 B1 | 8/2004 | Belani et al. | |
| 6,778,977 B1 | 8/2004 | Avadhanam et al. | |
| 6,785,673 B1 | 8/2004 | Fernandez et al. | |
| 6,795,821 B2 | 9/2004 | Yu | |
| 6,826,568 B2 | 11/2004 | Bernstein et al. | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,871,204 B2 | 3/2005 | Krishnaprasad et al. | |
| 7,028,028 B1 | 4/2006 | Balmin et al. | |
| 7,031,956 B1 | 4/2006 | Lee et al. | |
| 7,043,488 B1 | 5/2006 | Baer et al. | |
| 7,089,239 B1 | 8/2006 | Baer et al. | |
| 7,096,224 B2 | 8/2006 | Murthy et al. | |
| 2001/0037345 A1 | 11/2001 | Kiernan et al. | |
| 2002/0015042 A1 | 2/2002 | Robotham et al. | |
| 2002/0035606 A1 | 3/2002 | Kenton | |
| 2002/0038358 A1 | 3/2002 | Sweatt, III et al. | |
| 2002/0056025 A1 | 5/2002 | Qiu et al. | |
| 2002/0073019 A1 | 6/2002 | Deaton | |
| 2002/0099715 A1* | 7/2002 | Jahnke et al. | 707/100 |
| 2002/0116371 A1 | 8/2002 | Dodds et al. | |
| 2002/0116457 A1 | 8/2002 | Eshleman et al. | |
| 2002/0120685 A1 | 8/2002 | Srivastava et al. | |
| 2002/0123993 A1 | 9/2002 | Chau et al. | |
| 2002/0124100 A1 | 9/2002 | Adams | |
| 2002/0133484 A1 | 9/2002 | Chau et al. | |
| 2002/0143512 A1 | 10/2002 | Shamoto et al. | |
| 2002/0156772 A1 | 10/2002 | Chau et al. | |
| 2002/0156811 A1 | 10/2002 | Krupa | |
| 2002/0169788 A1 | 11/2002 | Lee et al. | |
| 2002/0184188 A1 | 12/2002 | Mandyam et al. | |
| 2002/0184401 A1 | 12/2002 | Kadel, Jr. et al. | |
| 2002/0194157 A1 | 12/2002 | Zait et al. | |
| 2002/0198874 A1 | 12/2002 | Nasr et al. | |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0070144 A1* | 4/2003 | Schnelle et al. | 715/513 |
| 2003/0078906 A1 | 4/2003 | Ten-Hove et al. | |
| 2003/0093672 A1 | 5/2003 | Cichowlas | |
| 2003/0101194 A1* | 5/2003 | Rys et al. | 707/101 |
| 2003/0105732 A1 | 6/2003 | Kagalwala et al. | |
| 2003/0140308 A1 | 7/2003 | Murthy et al. | |
| 2003/0158897 A1 | 8/2003 | Ben-Natan et al. | |
| 2003/0172135 A1 | 9/2003 | Bobick et al. | |
| 2003/0182624 A1 | 9/2003 | Large | |
| 2003/0212662 A1 | 11/2003 | Shin et al. | |
| 2003/0233618 A1* | 12/2003 | Wan | 715/513 |
| 2004/0015783 A1 | 1/2004 | Lennon et al. | |
| 2004/0006003 A1* | 3/2004 | Mani et al. | 715/513 |
| 2004/0043758 A1 | 3/2004 | Sorvari et al. | |
| 2004/0064466 A1 | 4/2004 | Manikutty et al. | |
| 2004/0088415 A1 | 5/2004 | Chandrasekar et al. | |
| 2004/0128296 A1* | 7/2004 | Krishnamurthy et al. | 707/100 |
| 2004/0148278 A1 | 7/2004 | Milo et al. | |
| 2004/0176958 A1 | 9/2004 | Salmenkaita et al. | |
| 2004/0220912 A1 | 11/2004 | Manikutty et al. | |
| 2004/0220927 A1 | 11/2004 | Murthy et al. | |
| 2004/0225680 A1 | 11/2004 | Cameron et al. | |
| 2004/0230667 A1 | 11/2004 | Wookey | |
| 2004/0236724 A1* | 11/2004 | Chien et al. | 707/3 |
| 2004/0267760 A1 | 12/2004 | Brundage et al. | |
| 2005/0010896 A1 | 1/2005 | Meliksetian et al. | |
| 2005/0050058 A1 | 3/2005 | Jain et al. | |
| 2005/0050092 A1 | 3/2005 | Jain et al. | |
| 2005/0228786 A1 | 10/2005 | Murthy et al. | |
| 2005/0228792 A1 | 10/2005 | Chandrasekaran et al. | |
| 2005/0229158 A1 | 10/2005 | Thusoo et al. | |
| 2005/0289125 A1 | 12/2005 | Liu et al. | |
| 2005/0289175 A1 | 12/2005 | Krishnaprasad et al. | |
| 2006/0031204 A1 | 2/2006 | Liu et al. | |
| 2006/0031233 A1 | 2/2006 | Liu et al. | |

FOREIGN PATENT DOCUMENTS

| | | |
|---|---|---|
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Web Data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

Peng, Feng et al., "XPath queries on streaming data", 2003, ACM Press, pp. 431-442.

Vion-Dury, Jean-Yves, "XPath on left and right sides of rules: toward compact XML tree rewriting through node patterns", 2003, ACM Press, pp. 19-25.

Banerjee, Sandeepan et al., "Oracle8i—The XML Enabled Data Management System"—Oracle Corporation, Mar. 2000, IEEE, pp. 561-568.

Bohannon, Philip, et al., "From XML Schema to Relations: A Cost-Based Approach to XML Storage"—Bell Laboratories, IEEE—2002—Proceedings of the 18th International Conference on Data Engineering (ICDE '02), pp. 1-28.

Bourret R., et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17th Iasted International Conference on Applied Informatics, Feb. 15-18, 1999, abstract.

Cheng, Josephine et al., "IBM DB2 XML Extender, An end-to-end solution for storing and retrieving XML documents.," IEEE, ICDE '00 Conference, San Diego, Feb. 2000, 128 pages.

Choi, Byron et al., "The XQuey Formal Semantics: A Foundation for Implementation Optimization," May 31, 2002, IEEE XP-002353605, 15 pages.

Cooper, Brian F. et al., "A Fast Index for Semistructured Data," Proceeding of the International Conference on Very Large Databases, 2001, XP-002303292, pp. 341-350.

Dayen, I., "Storing XML in Relational Databases", XML.com XP-002275971(1998-2004) pp. 1-13.

Dragos, Manolescu, Review of "Metadata solutions: using metamodels, repositories, XML, and enterprise portals to generate information on demand by Adrienne Tannenbaum", Mar. 2003, ACM Press, vol. 28, Issue 2, p. 38.

Drake, Mark et al., "Understanding the Oracle9i XML Type," Oracle Corporation, 2004, http://otn.oracle.com/oramag/oracle/01-nov/o61xml.html?_template=/ocom/technology, data retrieved Jun. 29, 2004, pp. 1-5.

Funderbunk, J. et al., "XML programming with SQL/XML and XQuery", *IBM Systems Journal* XP-002295973 (2002) pp. 642-665.

Gennick, Johnathan, "SQL in, XML out," Oracle Corporation, 2004, http://otn.oracle.com/oramag/oracle/03-may/o33xml.html?_template=/ocom/technology, data retrieved Jun. 29, 2004.

Hierarchical Queries, XP-002295972, pp. 8-3 to 8-7, 14 pages.

Higgins, Shelley, "Oracle9i, Application Developer's Guide—XML," Oracle Corporation, Release i (9.0.1), Jun. 2001, Part No. A88894-01, pp. 1-1,362.

Higgens, Shelley, , "Oracle9i, Case Studies—XML Applications," Oracle Corporation ,Release 1 (9.0.1), Jun. 2001, Part No. A88895-01, pp. 1-462.

Jajodia, Sushil, et al., "Toward a Multilevel Secure Relational Data Model," ACM, 1991, 8393 SIGMOD Record, 20 (1991) June, No. 2, New York, US, XP 000364619, pp. 50-59.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Khan, Latifur, "A Performance Evaluation of Storing XML Data in Relational Database Management Systems"—and Yan Rao—ACM-2001 (pp. 31-38).

Lawrence et al., "Integrating Relational Database Schemas Using a Standardized Dictionary"—2001—ACM (pp. 225-230).

McHugh, Jason, et al. "Indexing Semistructured Data," Stanford Science Department, 1998, XP-002248313, pp. 1-21.

McHugh, Jason et al., "Query Optimization for XML", XP-002333353, *Proceedings of the 25th VLDB Conference* (1999) pp. 315-326.

Melton, Jim, "ISO-ANSI Working Draft, XML-Related Specifications (SQL/XML)," WG3: DRS-020, H2-2002-365, Aug. 2002, 154 pages.

Murthy, Ravi et al., "XML Schemas in Oracle XML DB," Proceedings of the 29th VLDB Conference, 2003, IEEE XP-002353604, pp. 1009-1018.

Noser, Hansrudi et al., "Dynamic 3D Visualization of Database-Defined Tree Structures on the WWW by Using Rewriting Systems," 2000, IEEE, XP-002262516, pp. 247-254.

Oracle Corporation, "Oracle9i XML Database Developer's Guide—Oracle XML DB," Release 2 (9.2), Mar. 2002, Part No. A96620-1, pp. 5-8-5-10, 5-21-5-24, 5-52-5-70, 10-5-13 10-20 and 11-1-1-20.

Oracle Corporation, "Oracle9i Application Server, Administrator's Guide," Release 2 (9.0.2), May 2002, Part No. A92171-02, Part No. A92171-02, pp. 1-392.

Oracle Corporation, "Oracle9i XML Database Developer's Guide—Oracle XML DB," Release 2 (9.2), Mar. 2002, Part No. A96620-1, pp. 10-1-10-54.

Ramakrishnan, Ragu et al., "SRQL: Sorted Relational Query Language" Jul. 1-3, 1998, IEEE, pp. 84-95.

Ruey-Shun ,Chen, et al., "Developing an XML framework for metadata system", Trinity College Dublin, Proc. of the 1st Inter. Sympo. on Information and Communication, pp. 267-272.

Schmidt et al.—"Efficient Relational Storage and Retrieval of XML Documents"—CWI , The Netherlands (pp. 1-6).

Shanmugasundaram J., et al. "Querying XML Views of Relational Data," Proceedings of the 27th Very Large Databases Conference, Rome, Italy, Sep. 2001, pp. 261-270.

Vorthmann S. et al. "Beyond Schemas, Schema Adjuncts and the Outside World," Markup Languages, Online!, vol. 2, No. 3, Jun. 2000, pp. 1-8.

W3C, "XML Schema Part 1: Structures," W3C Recommendation, May 2, 2001, http://www.w3.org/TR/2001/REC-xmlschema-1-20010502/, pp. 1-203.

W3C, "XML Schema Part 2: Datatypes," W3C Recommendation, May 2, 2001, http://www.w3.org/TR/2001/REC-xmlschema-2-20010502/, pp. 1-146.

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.

W3C, "XQuery 1.0: An XML Query Language," W3C Working Draft dated Apr. 4, 2005, 170 pages.

W3C, "Extensible Markup Language (XML) 1.0 (Third Edition)", W3C Recommendation, dated Feb. 4, 2004, 34 pages.

W3C, "XQuery 1.0 and XPath 2.0 Data Model," W3C Working Draft dated Apr. 4, 2005, 91 pages.

W3C, "XML Path Language (XPath) 2.0," W3C Working Draft Dated Apr. 4, 2005, 89 pages.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Wansong, et al., "An Encoding Scheme for Indexing XML Data," E-Commerce and E-Service, 2004, XP-010697639, pp. 526-529.

Zhang, Xin et al., "Honey, I Shrunk the XQuery?—An XML Algebra Optimization Approach," Submission for WIDM'02 , IEEE XP-002316448, 14 pages.

Notification of Transmittal of the International Search Report and the Written Opinion of the International Searching Authority, or the Declaration received from International application No. PCT/US2005/011762.

Pending claims from International application No. PCT/US2005/011762.

International Preliminary Examination Report, Application No. PCT/US02/30783, Apr. 1, 2004, pp. 1-14.

Current claims in PCT/US02/30783, pp. 1-8.

International Searching Authority, International Search Report and Written Opinion, PCT/US2004/010018, dated Nov. 11, 2004, 14 pages.

PCT/US2004/010018—current claims.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

International Searching Authority, "Notification of the Transmittal of the International Search Report and the Written Opinion of the International Searching Authority, or the Declaration," PCT/US2005/020795, Mailing Date Sep. 27, 2005, 13 pages.

Current Claims, PCT/US2005/020795, 5 pages.

\* cited by examiner

BASED ON AN XML DOCUMENT, STORE A RECORD IN A FIRST TABLE, WHEREIN THE RECORD IN THE FIRST TABLE CORRESPONDS WITH AT LEAST THE OCCURRENCE OF A ROOT ELEMENT TYPE DESCRIBED IN AN XML SCHEMA TO WHICH THE DOCUMENT CONFORMS
102

BASED ON THE XML DOCUMENT, STORE A RECORD IN A SECOND TABLE, WHEREIN THE RECORD IN THE SECOND TABLE CORRESPONDS WITH AN OCCURRENCE OF A SECOND ELEMENT TYPE DESCRIBED IN THE XML SCHEMA AND INCLUDES A VALUE THAT IDENTIFIES THE RECORD IN THE FIRST TABLE
104

RECEIVE AN XML QUERY LANGUAGE QUERY THAT SPECIFIES A PATH FOR SELECTING THE OCCURRENCE OF THE SECOND ELEMENT TYPE
106

BASED ON THE QUERY, GENERATE A SQL QUERY THAT ACCESSES THE FIRST AND SECOND TABLES, WHEREIN THE SQL QUERY INCLUDES A JOIN OPERATION ON THE RECORD IN THE FIRST TABLE AND THE RECORD IN THE SECOND TABLE
108

*FIG. 1*

TABLE "DOCUMENT"

| DOC_ID | CHAPTER | SECTION |
|---|---|---|
| 01 | Chapter-1 | r01 |
| 02 | Chapter-2 | r04 |

TABLE "SECTION"

| root_ID | row_ID | TITLE | CONTENTS | CHILD |
|---|---|---|---|---|
| 01 | r01 | S1 | ... | r02 |
| 01 | r02 | S2 | ... | r03 |
| 01 | r03 | S3 | ... | null |
| 02 | r04 | S5 | ... | r05 |
| 02 | r05 | S6 | ... | null |

*FIG. 2*

TABLE X

| DOC_ID | ... | CHILD |
|---|---|---|
| x1 | ... | a1 |
| x1 | ... | ... |
| ... | ... | ... |
| x2 | ... | ... |

TABLE A

| ROOT_PATH_ID | row_id | ... | CHILD |
|---|---|---|---|
| x1 | a1 | ... | b1 |
| x1.a1.b1 | a2 | ... | null |
| ... | ... | ... | ... |

TABLE B

| ROOT_PATH_ID | row_id | ... | CHILD |
|---|---|---|---|
| x1.a1 | b1 | ... | a2, b2 |
| x1.a1.b1 | b2 | ... | null |
| ... | ... | ... | ... |

TECHNIQUES FOR EFFICIENTLY STORING AND QUERYING IN A RELATIONAL DATABASE, XML DOCUMENTS CONFORMING TO SCHEMAS THAT CONTAIN CYCLIC CONSTRUCTS

CROSS REFERENCE TO RELATED APPLICATIONS

This application is related to U.S. patent application Ser. No. 10/428,878 filed May 1, 2003, issued on Oct. 10, 2006 as U.S. Pat. No. 7,120,645, by Anand Manikutty et al., entitled "Techniques For Rewriting XML Queries Directed To Relational Database Constructs", the content of which is incorporated by this reference in its entirety for all purposes as if fully disclosed herein.

FIELD OF THE INVENTION

The present invention relates generally to relational database systems and, specifically, to efficiently storing in a relational database, and querying, XML documents that conform to schemas that contain cyclic constructs.

BACKGROUND

Cyclic Constructs

U.S. patent application Ser. No. 10/428,878 describes techniques for rewriting XPath queries on an XML document that has been decomposed and stored in object-relational constructs, into SQL queries on the XML data stored in the object-relational constructs. However, cyclic (also referred to as recursive) constructs are allowed in XML schemas, which are XML documents that describe the structure of corresponding XML documents. That is, the W3C Recommendations "XML Schema Part 1: Structures" and "XML Schema Part 2: Datatypes" allow for use of XML documents that conform to schemas that contain cyclic constructs.

Generally, an XML document that contains a cyclic construct contains (a) an occurrence of an element type that has a child ("contains") that is another occurrence of itself; or (b) an occurrence of an element type (the "first element" for this example) that has a child that is an occurrence of an element type from which the first element descends. In an XML document, an occurrence of a first element type is a "parent" of an occurrence of a second element type, which is a "child" of the occurrence of the first element type, if the occurrence of the second element type is indented relative to the occurrence of the first element type. That is, the occurrence of the second element type "descends" from the occurrence of the first element type, and the occurrence of the first element type "contains" the occurrence of the second element type. In practice, XML documents conforming to XML schemas that allow cyclic constructs are common.

The following is an example of a cyclic construct, depicted in a hierarchical form.

In this example, element x contains element a; element a contains element b; and element b contains element a and element b. Hence, such a document is cyclic because element b contains element a, from which it descends, and contains an occurrence of itself.

For another example of a cyclic construct, consider the following schema.

```
<schema targetNamespace= "myNS"
xmlns=http://www.w3.org/2001/XMLSchema
        xmlns:law= "myNS">
    <element name= "Chapter">
    <complexType>
    <sequence>
        <element ref= "Section"/>
    </sequence>
    </complexType>
    <element name= "Section">
    <complexType>
    <sequence>
        <element name= "ID" type= "integer"/>
        <element name= "Contents" type= "string"/>
        <element ref= "Section" min_occurs=0/>
    </sequence>
    </complexType>
</schema>
```

In this example, an XML document that conforms to this schema may include a "Chapter" element that contains a "Section" element, where a "Section" element may contain a "Section" element.

Storing XML Data in a Relational Database

With one approach to storing XML data in a relational database, XML documents are decomposed (also referred to as "shredded"), with the elements and attributes (generally, "objects") contained therein stored in object-relational tables. Often, such objects are stored using multiple tables, with references from table to table to complete paths through the XML document hierarchy. This may be done for any of a number of reasons, for example, due to repeating elements (also referred to as "collections") within the document, limitations regarding the number of columns that a table may contain, due to the presence of cyclic constructs, or to share some of the objects among applications. A "main table" typically stores a portion of the objects associated with XML documents that conform to a given XML schema, including information about the root node of the documents, where each record in the main table corresponds to such an XML document. One or more "out-of-line" tables are often used to store some of the objects, possibly for one of the foregoing reasons. For example, contents of collections are often stored in an out-of-line table.

Further, execution of a SQL query, which is generated based on an XPath query, against tables containing XML data in object-relational form, significantly outperforms DOM-based (Document Object Model) execution of the XPath query. This is because DOM-based execution is a computationally expensive operation because the DOM tree-based representation of an XML document is in-memory. This in-memory representation is inefficient due to its memory usage and is detrimental to system performance due to the iterative nature of the query process in which, for each row in the tables being queried, a DOM is created in-memory and an operation is evaluated.

Previously, rewriting XPath queries on XML documents utilizing a cyclic construct, into SQL queries, was not possible. Because the structure is cyclic, when an XML document is decomposed into object-relational tables, objects from such documents are stored using references from table to table. Thus, all "Section" objects would be stored in a table (e.g., a "Section" table) as rows that are referenced by rows in one or more other tables (e.g., a "Chapter" table), because the "Chapter" XML element contains the "Section" XML element. However, there was no mechanism for knowing what "Chapter" a given "Section" descends from and, therefore, what rows should be joined in the SQL query. Further, within the "Section" table, one row may point to another row, to account for the cyclic nature of a "Section" XML element referencing another "Section" XML element.

Some XPath queries request every occurrence of an XML element type in one or more documents, regardless of where, in the XML hierarchy, each occurrence resides. The common operator used for such queries is referred to as "slash slash" (//), or "descendent-or-self". Thus, with the foregoing schema example, an accurately-executed XPath query "/Chapter// Section/Contents" would return the contents of all occurrence of "Section", whether such instances are referenced by a "Chapter" or by another "Section." Further, XPath queries may contain predicates on a particular object node set, such as "/Chapter//Section[ID=5]/Contents" (where "ID=5" is the predicate), which requests the contents of all Sections having an ID=5, regardless of where in the XML hierarchy each occurrence resides.

As discussed, with cyclic XML documents, rewriting an XPath query to accurately query corresponding object-relational tables, was not possible. This is because, for example, it is not known which particular rows in the "Section" table correspond to which particular rows in the "Chapter" table. Knowledge of the corresponding rows would be necessary for joining the corresponding rows, in order to completely execute the query without entering an infinite loop. Further, with cyclic XML documents, accurately rewriting an XPath query that includes a "slash slash" operator is not possible for at least the same reason. For example, rewriting the XPath query "/Chapter-1//Section[ID=5]/Contents", is not possible because it is not known at query compilation time how many levels deep the "Section" hierarchy may be, and which rows in the "Section" table would need to be joined with which row in the "Chapter" table.

Based on the foregoing, there is a need for an improved technique for storing in a relational database, and querying, XML documents that conform to schemas that contain cyclic constructs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments of the Invention

In order to associate XML data objects ("child objects"), stored in rows of relational or object-relational tables, with the appropriate XML data objects ("parent objects") from which the child objects descend, tables that contain child objects ("out-of-line" tables) are constructed with an additional column. In one embodiment, this column stores values that identify the root objects, in the appropriate table, from which the respective child objects descend. Hence, the root object from which any given object descends is traceable by following the respective value back to the corresponding root object. In one embodiment, this column stores values that identify the complete XML hierarchical path, through multiple tables, back to the root object from which the respective child objects descend. Hence, the path to the root object from which any given object descends is traceable by following the value(s) back to the corresponding root object.

Consequently, XML query language queries against XML documents stored in such tables can be rewritten as SQL queries against the data in the tables, even in the presence of cyclic constructs. This is because the ambiguity is eliminated as to which row in a child table is referenced, according to the XML structure, by a row in a parent table. Hence, the ambiguity is eliminated as to which rows to join from respective tables, in the SQL queries.

A Method for Storing XML Documents in a Relational Database

Figure 1:
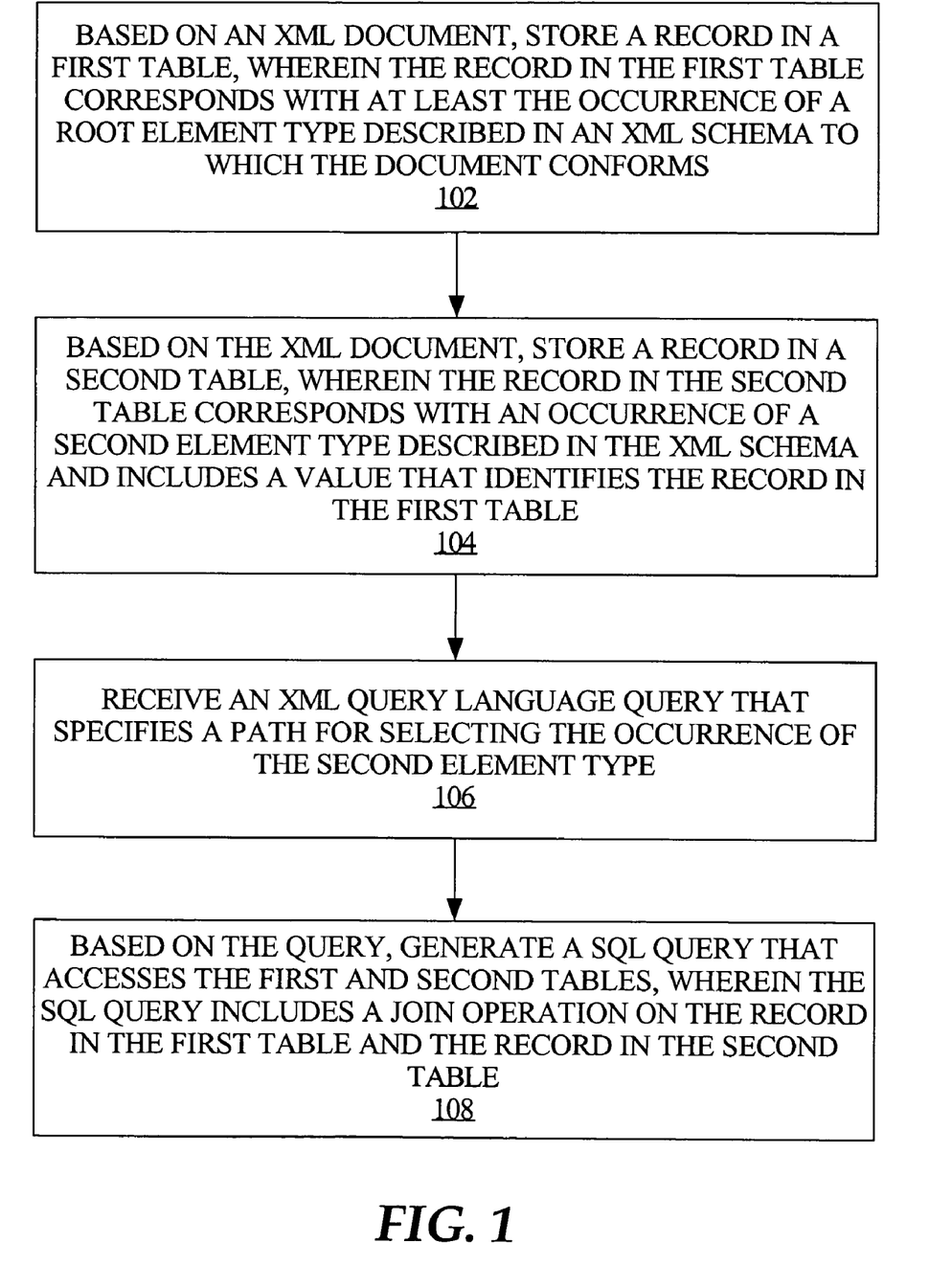
FIG. 1 is a flow diagram that illustrates a method for storing XML documents in a relational database, according to an embodiment of the invention.

FIG. 1 is a flow diagram that illustrates a method for storing XML documents in a relational database, according to an embodiment of the invention. The method depicted in FIG. 1 is performed, in one embodiment, by a relational database server executing on a computer system, such as computer system 400 of FIG. 4.

Prior to performance of the method of FIG. 1, tables are constructed to use for storing XML data from documents that conform to an XML schema on which the tables are based. In one embodiment, the tables are constructed in response to registration of an XML schema with a relational database server, which will manage data from documents that conform to the schema. The XML schema may or may not allow cyclic constructs. However, use of such tables in the context of XML schemas allowing cyclic constructs provides advantages described herein.

In one embodiment, during a schema registration process it is determined whether the schema allows cyclic constructs. If the schema allows cyclic constructs, then tables are responsively constructed to facilitate the method illustrated in FIG. 1. Such table construction includes constructing an out-of-line table having a column for storing values that identify a row, in another table, associated with the corresponding occurrence of a root element type.

For example, a main table is constructed to store a portion of the data from each of the XML documents that conform to the schema and that will be stored in the relational database. The main table includes at least data that is associated with the root node of the XML hierarchy described in the schema. One or more out-of-line tables are constructed to store data associated with occurrences of a respective XML element type that is described in the schema. Simplified examples of such tables are illustrated in, and described in reference to, FIG. 2 and FIG. 3.

Generally, at block 102 and block 104, a first table and a second table are populated with data from an XML document that conforms to the schema, where the XML document contains an occurrence of a root element type and an occurrence of a second element type that descends from the occurrence of the root element type. The occurrence of the second element type may descend immediately from the occurrence of the root element type or may not descend immediately from the occurrence of the root element type. The step of populating includes blocks 102 and 104. In one embodiment, it is first determined that the XML document contains a cyclic construct, and the tables are populated in response to such determination.

Specifically, at block 102, a record is stored in the first table, where the record in the first table corresponds with, and represents, at least the occurrence of the root element type. In one embodiment, the record in the first table includes a value that identifies a record, in the second table, that corresponds with the occurrence of the second element type. For example, the first table contains a column for storing references from parent data objects or rows to child data objects or rows. In one embodiment, the value in the first record represents an identifier of the row associated with the occurrence of the second element type. Hence, this value can be used to locate the row associated with the occurrence of the second element type, in the second table. In another embodiment, the value represents a pointer to the row associated with the occurrence of the second element type.

At block 104, a record is stored in the second table, where the record in the second table corresponds with, and represents, at least the occurrence of the second element type. Significantly, the record in the second table includes a value that identifies the record in the first table, which corresponds with the occurrence of the root element type. For example, the second table contains a column for storing values that identify the row, in the first table, associated with the corresponding occurrence of the root element type. In one embodiment, the value represents an identifier of the row associated with the occurrence of the root element type, such as a system-based row identifier (e.g., row_id).

At block 106, an XML query language query is received which specifies a path for selecting the occurrence of the second element type. An example of such a query is described in reference to FIG. 2. In one embodiment, the query is an XPath query. In another embodiment, the query is an XQuery query.

At block 108, based on the query, a SQL query is generated that accesses the first and second tables. Significantly, the SQL query includes a join operation on the record in the first table and the record in the second table. The join operation is based on (1) the join key column, in the first table, that stores an identifier of the record in the first table, and (2) the join key column, in the second table, that stores the value that identifies the record in the first table. An example of such a query is described in reference to FIG. 2.

In one embodiment, the query received at block 106 includes an XPath descendent-or-self operator ("slash slash", or "//") between the root element identifier and the second element identifier. For example, the XPath query may be represented as "/Chapter-1//Section". Further, the XPath query may include a predicate, with an example represented as "/Chapter-1/Section[title="S3"]", where "title=S3" is the predicate on the Section element type. The presence of a descendent-or-self operator in an XPath query means that all occurrences of the element type specified immediately after the operator, which descend at any level from the occurrence of the element type specified immediately before the operator, are requested in the query. With the foregoing example, that means that all occurrences of the "Section" element type that descend from the "Chapter-1" occurrence of the "Chapter" element type are requested, regardless of at what level away from the "Chapter-1" occurrence the "Section" occurrences occur.

Figure 3:
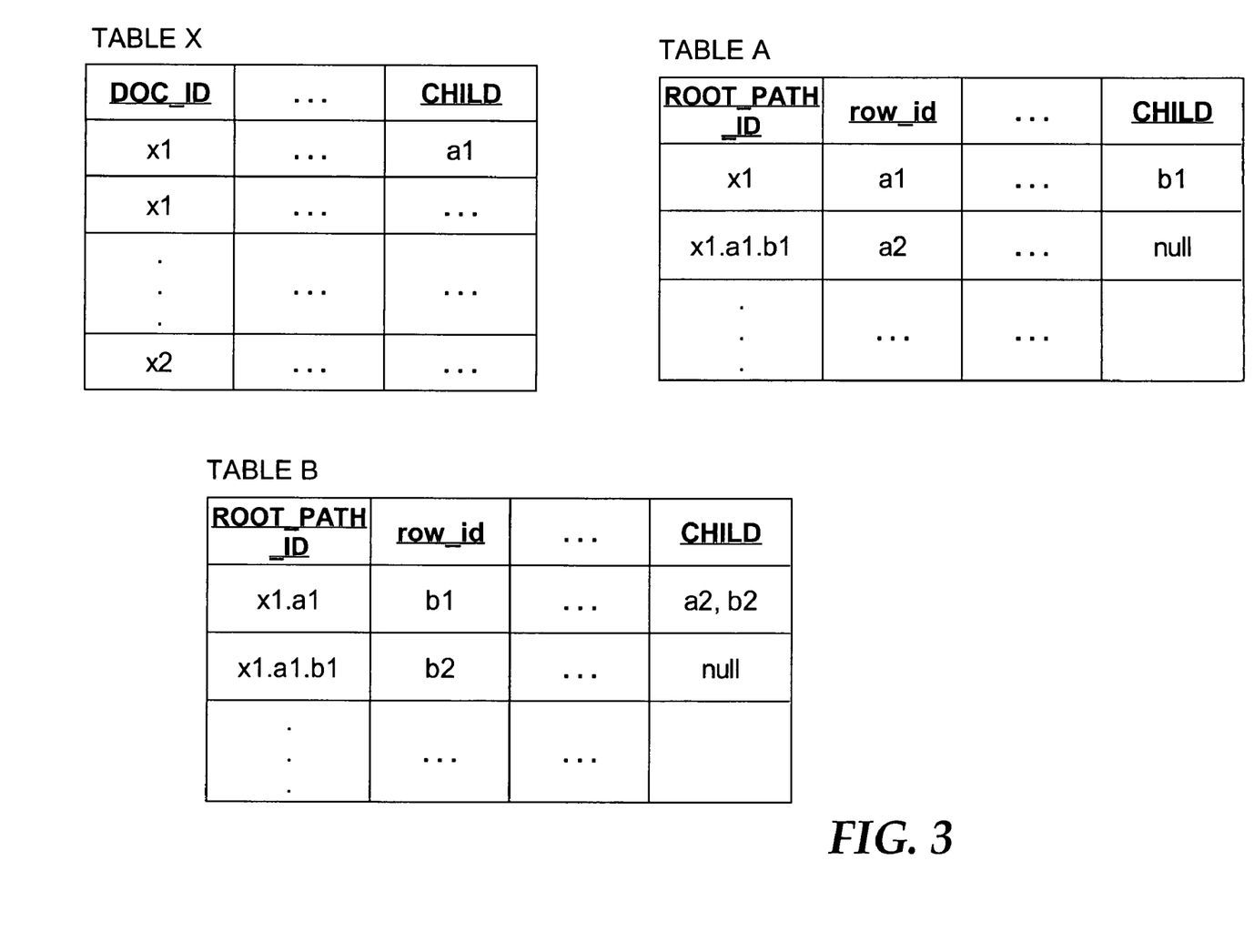
FIG. 3 is a diagram that illustrates three simplified database tables, configured according to an embodiment of the invention.

Further, in one embodiment, which is illustrated in FIG. 3, there are multiple out-of-line tables. In this embodiment, a third table is populated with data from the XML document, where the document contains an occurrence of a third element type that descends directly from the occurrence of the second element type. The third table is populated by storing a record in the third table that includes a value that identifies a path to the record in the first table, i.e., the root record. Hence, the path to the root record identifies both the record in the second table and the record in the first table. Consequently, any level of recursion in XML documents can be provided for, with the table structure and techniques described herein.

Examples of Storing XML Documents in a Relational Database

Reference to Root

Figure 2:
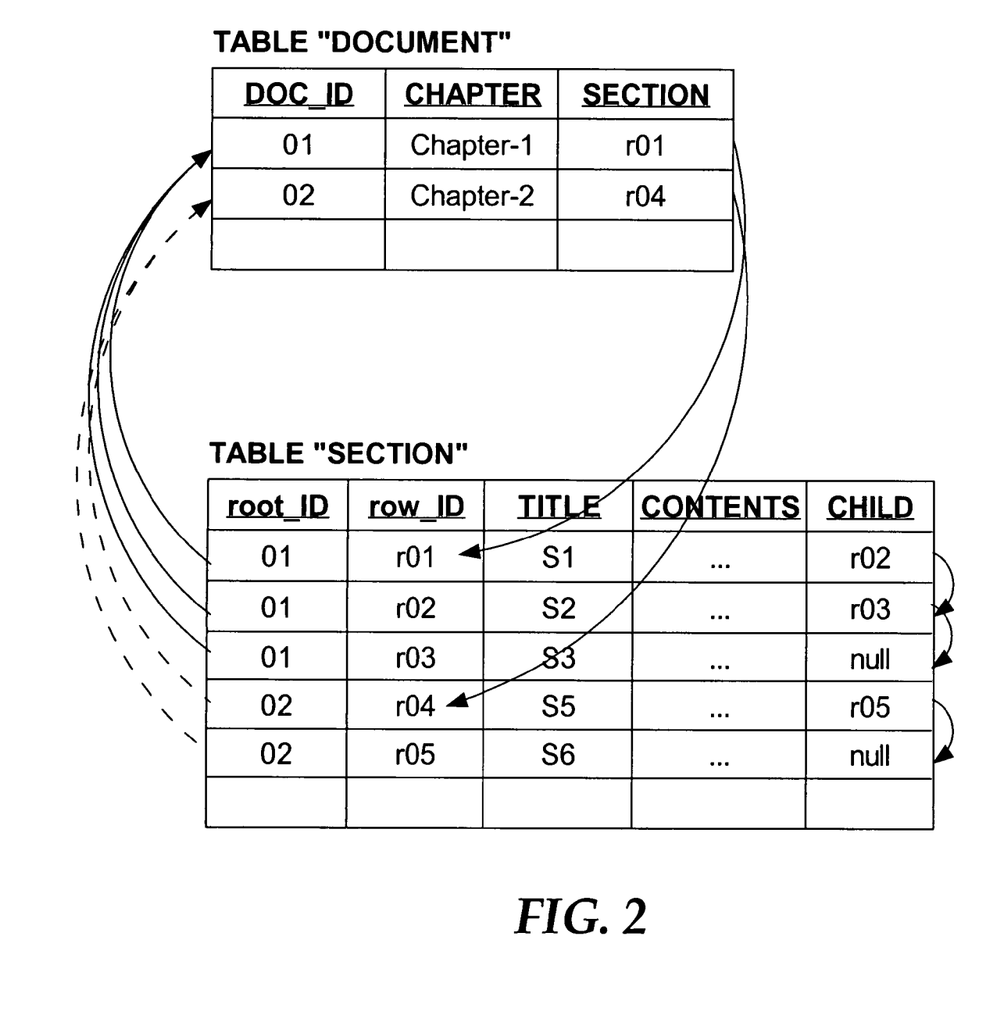
FIG. 2 is a diagram that illustrates two simplified database tables, configured according to an embodiment of the invention.

In one embodiment, an out-of-line table (which is associated with one or more particular elements from an XML document) contains a column that stores references to respective root records, stored in a main table, from which respective out-of-line records descend. That is, each record in the out-of-line table contains a reference back to its root record, in the main table, from which the out-of-line record descends. The record in the main table corresponds with the XML document that contains the particular element type associated with the out-of-line record. FIG. 2 is an illustration of this embodiment, where the out-of-line records identify, or refer back to, the root record.

FIG. 2 is a diagram that illustrates two simplified database tables, configured according to an embodiment of the invention. Any actual implementation of such tables may vary from those depicted in FIG. 2, and may contain more columns than depicted. Rather, the tables depicted in FIG. 2 are simplified for purposes of brevity and clarity, and are illustrated in this manner for purposes of describing this example.

The tables of FIG. 2, "Document" and "Section", are constructed, based on an XML schema that allows a cyclic construct, to which the following XML fragments conform.

```
<Chapter-1>
    <Section title = "S1">
        <Section title = "S2">
            <Section title = "S3">
            <Section>
        <Section>
</Chapter-1>
```

```
<Chapter-2>
    <Section title = "S5">
        <Section title = "S6">
    <Section>
</Chapter-2>
```

Note that each fragment is cyclic because an occurrence of a "Section" element type contains another occurrence of a "Section" element type.

As depicted in the out-of-line "Section" table, each of the records for Sections S1, S2, and S3 contains a reference back to the same record in the "Document" table. In the first XML fragment above, each of Sections S1, S2, and S3 is contained within a root XML document entitled "Chapter-1". Hence, in the "Section" table, the records corresponding to Sections S1, S2, and S3 contain a reference ("01" in the "root_ID" column) to the record, in the "Document" table, that corresponds to Chapter-1. The type of reference used may vary from implementation to implementation. In this example, the out-of-line "Section" table utilizes an identifier of the root record (e.g., "DOC_ID") from the "Document" table, such as a system-level row identifier.

Likewise, each of the records for Sections S5 and S6 contains a reference back to the same record in the "Document" table because, in the second XML fragment above, each of Sections S5 and S6 is contained within a root XML document entitled "Chapter-2". Hence, in the "Section" table, the records corresponding to Sections S5 and S6 contain a reference (in the "root_ID" column) to the record, in the "Document" table, that corresponds to "Chapter-2".

Further, in an implementation depicted in FIG. 2, the out-of-line "Section" table further accounts for the cyclic structure of corresponding XML documents by utilizing records, within the table, referring to other records within the same table. In the first fragment above, Section S1 contains Section S2, which contains Section S3. Hence, in the "Section" table, the record for Section S1 refers (via the row_ID of Section 2 in the "CHILD" column of Section 1) to the record for Section S2, and the record for Section S2 refers to the record for Section S3.

Based on the tables of FIG. 2, the following XPath query,
select [extract (xmlcol, '/Document//Section[title=S3]')]
from Documentxml.d
where DOC_ID=1;

can be rewritten as a SQL query as follows,
select (select xmlagg(value(s))
from SECTIONTAB s
where s.title=S3 and s.root_ID=d.DOC_ID order by row_id)
from Documentxml d
where DOC_ID=01;

where which rows are joined from the "Document" and "Section" tables is based on which rows in the "Section" table have a title="S3" and a root_ID=DOC_ID="01", and which rows in the "Document" table have DOC_ID="01". Consequently, when the SQL query is executed against these tables, the rows from the "Section" table identified with row_IDs of "r01", "r02", and "r03" will be joined with the row from the "Document" table identified with a DOC_ID of "01", without entering an infinite loop.

The technique illustrated in FIG. 2 can be readily expanded to support more than two tables, by including a column in each table that stores values that identify the root from which each record descends, e.g., identify the root node of the XML document that contains the element occurrence that corresponds to each record.

Reference Path to Root

In one embodiment, an out-of-line table (which is associated with one or more particular element occurrences from an XML document) contains a column that stores references to respective paths to the root record from which respective out-of-line records descend. That is, each record in the out-of-line table contains a value that identifies the path back to a record in the main table from which the out-of-line record descends, where the record in the main table corresponds with the XML document that contains the particular element occurrence associated with the out-of-line record. The path to the root record may include portions of the path that are stored in one or more different tables. FIG. 3 is an illustration of this embodiment, where each out-of-line record contains values that identify the record's unique path back to the root record in the main table.

FIG. 3 is a diagram that illustrates three simplified database tables, configured according to an embodiment of the invention. Any actual implementation of such tables may vary from those depicted in FIG. 3, and may contain more columns than depicted. For example, each out-of-line table may also contain a column that stores values that directly identify the root record from which each out-of-line record descends (e.g., similar to that illustrated in FIG. 2), in addition to the column that contains values that identify the path back to the root record. The tables depicted in FIG. 3 are simplified for purposes of brevity and clarity, and are illustrated in this manner for purposes of describing this example.

The tables of FIG. 3, labeled "Table X", "Table A" and "Table B", are constructed based on an XML schema that allows a cyclic construct. The following is an example of this cyclic construct, depicted in a hierarchical form.

In this example, element x1 contains element a1; element a1 contains element b1; and element b1 contains element a2 and element b2. Hence, such a document is cyclic because (1) element b1 contains an occurrence of element a (i.e., a2), and element b1 descends from an occurrence of element a (i.e., a1), and (2) an occurrence of element b (i.e., b1) contains an occurrence of itself (i.e., b2).

As depicted in the out-of-line Table A and Table B, each of the records contains a reference, for the corresponding element occurrence, to the element occurrence's path to the root record in the main table, Table X. In the hierarchical construct shown above, element occurrence a1 descends directly from the root element occurrence x1, which is identified with DOC_ID "x1" in Table X. Hence, in Table A, the record corresponding to element occurrence a1 (depicted in Table A with a "row_id" of "a1") contains a value that identifies (i.e., "x1" in the "root_path_ID" column) the path from the occurrence a1 to the record, in Table X, that corresponds to the root element occurrence x1. The type of reference used may vary from implementation to implementation. In this example, the out-of-line tables utilize a dot notation identifier to identify the path to the root record in Table X. Further, the path identifier may be encoded.

Traversing down the cyclic construct hierarchy, element occurrence b1 descends from element occurrence a1. Hence, in Table B, the record corresponding to occurrence b1 (depicted in Table B with a "row_id" of "b1") contains a value that identifies (i.e., "x1.a1" in the "root_path_ID" column) the path from the occurrence b1 to the record, in Table X, that corresponds to root element x1. Element occurrence a2 descends from element occurrence b1. Hence, in Table A, the record corresponding to occurrence a2 contains a value that identifies (i.e., "x1.a1.b1" in the "root_path_ID" column) the path from the occurrence a2 to the record, in Table X, that corresponds to root element x1. Similarly, element occurrence b2 also descends from element occurrence b1. Hence, in Table B, the record corresponding to occurrence b2 contains a value that identifies (i.e., "x1.a1.b1" in the "root_path_ID" column) the path from the occurrence b2 to the record, in Table X, that corresponds to root element x1.

Further, each record in each table includes a reference to any records corresponding to direct descendent elements. For example, the "CHILD" column in each table includes values that refer to (or point to) the record, in the same or a different table, that corresponds to each respective descendent element occurrence that is an immediate descendent, i.e., one level away. Hence, (1) the record for element x1 includes a reference to the record for element a1, e.g., the value "a1" in the "CHILD" column of Table X, which refers to the value "a1" in the "row_id" column of Table A; (2) the record for element a1 includes a reference to the record for element b1, e.g., the value "b1" in the "CHILD" column of Table A, which refers to the value "b1" in the "row_id" column of Table B; and (3) the record for element b1 includes references to the records for elements a2 and b2, e.g., the value "a2, b2" in the "CHILD" column of Table B, which refers to the value "a2" in the row_id column of Table A and the value "b2" in the "row_id" column of Table B.

The described table structure provides for traversal down and traversal up the XML hierarchy associated with XML documents stored in such a table structure. Therefore, any queries submitted against XML data stored in such tables, having recursion associated with any levels of the XML hierarchy, can be rewritten (e.g., by a database server) into SQL queries against the tables. Such SQL queries are generated with appropriate join operations, joining records from the multiple tables based on values in the "root_path_ID", "row_ID" and "DOC_ID" columns. Execution of such SQL queries by a database server are significantly more computationally efficient operations than execution of DOM-based XPath queries. This is because, for example, no DOM trees need to be constructed in-memory, and indexes can be constructed on, and used for querying, the out-of-line tables.

Hardware Overview

Figure 4:
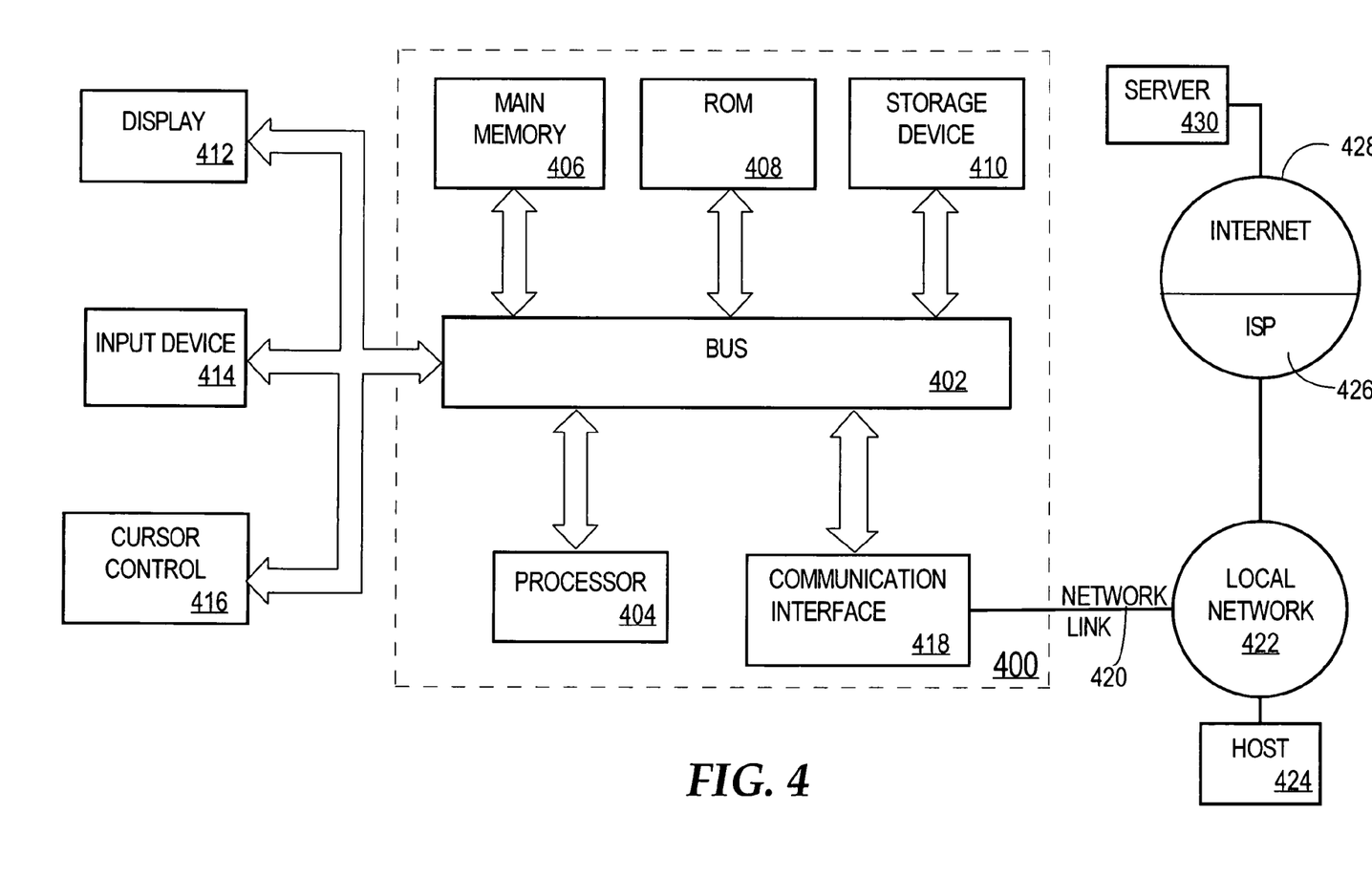
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402.

Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for storing XML documents in a relational database, the method comprising:
    populating a first table and a second table, which are stored within said relational database on a storage medium, with data from an XML document that conforms to an XML schema, wherein the document contains an occurrence of a root element type and a first occurrence of a second element type and a second occurrence of said second element type; wherein the first and second occurrences that descend from the occurrence of a root element type;
    wherein the step of populating comprises:
    a processor storing a record in the first table, wherein the record in the first table corresponds with at least the occurrence of the root element type; and
    storing a first record in the second table, wherein the first record in the second table corresponds with the first occurrence of the second element type;
    storing a second record in the second table, wherein the second record corresponds to said second occurrence of the second element type that descends from the first occurrence of the second element type;
    wherein each of the first record and the second record in the second table includes a value that identifies the record in the first table; and
    wherein the first table is a separate table than the second table;
    wherein the schema describes a cyclic construct and the XML document contains a cyclic construct of which the first and second occurrences of the second element type is part.

2. The method of claim 1, the method further comprising:
    receiving an XML query language query that specifies a path for selecting the occurrence of the second element type; and
    based on the query, generating a SQL query that accesses the first and second tables, wherein the SQL query includes a join operation on the record in the first table and the first record in the second table.

3. The method of claim 2, wherein the query is an XPath query.

4. The method of claim 2, wherein the query is an XQuery query.

5. The method of claim 2, wherein the step of generating a SQL query includes generating a SQL query that includes a join operation based on a join key column, in the first table, that stores an identifier of the record in the first table and a join key column, in the second table, that stores the value that identifies the record in the first table.

6. The method of claim 2, wherein the query includes a descendent-or-self operator between the second element type and the root element type.

7. The method of claim 6, wherein the step of generating a SQL query includes generating a SQL query that includes a join operation based on a join key column, in the first table, that stores an identifier of the record in the first table and a join key column, in the second table, that stores the value that identifies the record in the first table.

8. The method of claim 1, the method further comprising:
    populating a third table with data from the XML document, wherein the document contains an occurrence of a third element type that descends immediately from the first occurrence of the second element type; and
    wherein the step of populating the third table includes:
    storing a record in the third table, wherein the record in the third table includes a value that identifies a path to the record in the first table, wherein the path identifies the first record in the second table and the record in the first table.

9. The method of claim 8, wherein the first record in the second table includes a value that identifies the record, in the third table, that corresponds with the occurrence of the third element type.

10. The method of claim 1, wherein the second table contains records that correspond to each respective occurrence of the second element type in the XML document.

11. The method of claim 1, wherein, in the XML document, the first occurrence of the second element type descends immediately from the occurrence of the root element type.

12. The method of claim 1, wherein, in the XML document, the first occurrence of the second element type does not descend immediately from the occurrence of the root element type.

13. The method of claim 1, further comprising:
   determining that the XML document contains a cyclic construct; and
   wherein the steps of storing the record in the first table and storing the first record in the second table are performed in response to determining that the XML document contains a cyclic construct.

14. The method of claim 1, wherein the second table contains records that correspond to each respective occurrence of the second element type in the XML document, and wherein the first record in the second table includes a value that identifies the second record in the second table.

15. The method of claim 14, wherein the second record in the second table includes a value that identifies the first record in the second table.

16. A machine-readable storage medium storing one or more sequences of instructions which, when executed by one or more processors, causes the one or more processors to perform the method recited in claim 1.

17. A machine-readable storage medium storing one or more sequences of instructions which, when executed by one or more processors, causes the one or more processors to perform the method recited in claim 2.

18. A machine-readable storage medium storing one or more sequences of instructions which, when executed by one or more processors, causes the one or more processors to perform the method recited in claim 3.

19. A machine-readable storage medium storing one or more sequences of instructions which, when executed by one or more processors, causes the one or more processors to perform the method recited in claim 4.

20. A machine-readable storage medium storing one or more sequences of instructions which, when executed by one or more processors, causes the one or more processors to perform the method recited in claim 5.

21. A machine-readable storage medium storing one or more sequences of instructions which, when executed by one or more processors, causes the one or more processors to perform the method recited in claim 6.

22. A machine-readable storage medium storing one or more sequences of instructions which, when executed by one or more processors, causes the one or more processors to perform the method recited in claim 7.

23. A machine-readable storage medium storing one or more sequences of instructions which, when executed by one or more processors, causes the one or more processors to perform the method recited in claim 8.

24. A machine-readable storage medium storing one or more sequences of instructions which, when executed by one or more processors, causes the one or more processors to perform the method recited in claim 9.

25. A machine-readable storage medium storing one or more sequences of instructions which, when executed by one or more processors, causes the one or more processors to perform the method recited in claim 10.

26. A machine-readable storage medium storing one or more sequences of instructions which, when executed by one or more processors, causes the one or more processors to perform the method recited in claim 11.

27. A machine-readable storage medium storing one or more sequences of instructions which, when executed by one or more processors, causes the one or more processors to perform the method recited in claim 12.

28. A machine-readable storage medium storing one or more sequences of instructions which, when executed by one or more processors, causes the one or more processors to perform the method recited in claim 13.

29. A machine-readable storage medium storing one or more sequences of instructions which, when executed by one or more processors, causes the one or more processors to perform the method recited in claim 14.

30. A machine-readable storage medium storing one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

PATENT NO. : 7,523,131 B2  Page 1 of 1
APPLICATION NO. : 11/056312
DATED : April 21, 2009
INVENTOR(S) : Warner et al.

It is certified that error appears in the above-identified patent and that said Letters Patent is hereby corrected as shown below:

On page 3, in column 1, under "Other Publications", line 33, delete "XQuey" and insert -- XQuery --, therefor.

On page 3, in column 1, under "Other Publications", line 56, delete "Release i" and insert -- Release 1 --, therefor.

On page 3, in column 2, under "Other Publications", line 17, delete "10-5-13 10-20" and insert -- 10-5–10-20 --, therefor.

On page 3, in column 2, under "Other Publications", line 18, delete "11-1-1-20." and insert -- 11-1–11-20. --, therefor.

In column 12, line 4, in claim 1, before "descend" delete "that".

Signed and Sealed this

Twenty-fifth Day of May, 2010

David J. Kappos
*Director of the United States Patent and Trademark Office*